Patented June 16, 1936

2,044,725

UNITED STATES PATENT OFFICE 2,044,725

MANUFACTURE OF LUBRICATING OIL

Francis X. Govers, Vincennes, Ind., assignor to Indian Refining Company, Lawrenceville, Ill., a corporation of Maine No Drawing. Application August 8, 1934, Serial No. 738,932

10 Claims. (Cl. 196—17)

This invention relates to refining mineral oil with solvents for the production of lubricating oils.

The invention contemplates the production of lubricating oil from mixed-base crudes and the like, containing asphaltic, naphthenic and paraffinic constituents including wax, by a process involving treatment of the oil with a solvent liquid or mixture of solvent liquids adapted to separate and remove these undesired constituents from the oil.

More specifically, the invention comprises treatment of the oil, for the separation and removal of its asphaltic bodies, with amyl alcohol, or a mixture of aliphatic alcohols having the empirical formula $C_5H_{11}OH$, such as a mixture of normal amyl alcohol and its principal isomers. After the removal of the separated asphaltic bodies, the oil is extracted with benzaldehyde, or other suitable aromatic aldehyde, advantageously in the presence of a portion of the alcohol solvent, to separate from the oil the naphthenic constituents. The oil may then be dewaxed, using a suitable selective solvent or solvent mixture. Amyl alcohol and benzaldehyde have been found to exert a selective action as between wax and oil when mixed in proper proportions. Therefore, a suitable dewaxing solvent mixture, in this instance, comprises a mixture of amyl alcohol and benzaldehyde in proportions such that the solvent exerts selective action as between wax and oil at temperatures of around 0° F. and below.

The dewaxing step advantageously follows the extraction step, although it may, in the case of certain oils, precede the foregoing extraction step. Depending upon the nature of the oil, it is frequently advantageous to subject wax-bearing oil to an initial separating treatment to remove certain hydrocarbon material which, if not removed, and while acting as a third component of the mixture of solvent and wax-bearing oil, will tend to modify the wax anti-solvent property of the solvent mixture and thus interfere with the separation of the wax.

There are certain constituents of the oil removed along with the asphaltic and naphthenic bodies of the oil which hinder the separation of the wax in a readily filterable form, and which also impede subsequent filtration. These constituents are of such a nature that they may not be sufficiently removed by extraction alone, or by the deasphaltizing step alone. It may be advantageous, therefore, to subject the oil to a deasphaltizing, as well as a subsequent solvent extraction treatment prior to dewaxing.

Accordingly, after such preliminary treatment to remove the asphaltic bodies and, if desired, the relatively naphthenic constituents, all or in part, the oil is then dewaxed. Following dewaxing, the oil may be subjected to a further fractional separation into fractions of differing viscosity index.

The invention contemplates effecting the removal of asphaltic, naphthenic and wax constituents from the oil through the agency of a common solvent, such as amyl alcohol or a mixture of amyl alcohols in conjunction with an extraction solvent of the character of benzaldehyde, and thus provide a unitary operation, the succeeding steps of which are accomplished by the addition or removal, totally or in part, of one of the solvent components.

Moreover, the component solvents exert a beneficial modifying effect upon each other in the admixture so that from the standpoint of separation from the oil of a high yield of raffinate of desired viscosity index, improved results are realized over using the individual solvents alone.

In accordance with the procedure of my invention, a wax-bearing fraction, such as a residual cylinder stock, derived from mixed-base crude, may be mixed with about three to four volumes of amyl alcohol at a temperature of about 110° F. After thorough mixing, the resulting mixture is allowed to settle, or, if desired, is subjected to centrifuging, for the purpose of separating the asphaltic bodies which are insoluble in the oil-alcohol mixture.

After removal of the asphaltic matter, benzaldehyde is added in the desired proportion to effect solvent extraction of the naphthenic constituents from the oil. Thus, the mixture may be composed of about one part of oil to about two parts of solvent liquid mixture composed of three parts of benzaldehyde and two parts of amyl alcohol. In order to obtain the proper proportion of alcohol, it may be necessary, in some cases, to strip out some of the alcohol, prior to adding the aldehyde, while in others it may be necessary to add an additional quantity. The resulting mixture separates into two layers at temperatures of around 95° F., the lower layer comprising highly naphthenic oil, while the upper layer comprises relatively more paraffinic oil including paraffin wax.

After removal of the bottom or naphthenic layer, additional quantities of benzaldehyde and alcohol are added to the remaining layer sufficient to form a solvent mixture composed of about three parts of benzaldehyde and seven parts of alcohol, and in the proportion of about four parts of solvent mixture to one part of oil. This mixture contains the solvents in proportions such that the mixture exerts a selective action as between wax and oil at temperatures of 0° F. and below.

This mixture is then chilled to below 0° F. in order to solidify the wax which may then be removed by filtering or centrifuging.

The dewaxed mixture may then be subjected to further separation, and which is advantageously effected by heating and distilling off a portion, or substantially all, of the alcohol, leaving a mixture of oil and solvent comprising mainly benzaldehyde and which, when cooled, will separate into layers respectively rich in relatively low and relatively high viscosity index constituents due to the selective action of the benzaldehyde.

It may be desirable, in the case of certain oils, to reverse the foregoing order of steps, and subject the oil to solvent separation to remove all of the undesired low viscosity index constituents, and thereafter dewaxing the thus separated oil to produce the final desired product of low pour test. In other cases, it may be sufficient to subject the oil to dewaxing first, followed by separation into the desired fractions.

As a specific example of the practice of my invention, in which the deasphaltizing step per se is omitted, I may take an acid-treated wax distillate derived from Mid-Continent crude and having the following characteristics:

| | |
|---|---|
| Gravity °A. P. I. | 22.3 |
| Saybolt universal viscosity at 210° F. | 75 |
| Pour test °F. | 95 |

One thousand gallons of this oil is mixed with about 800 gallons of alcohol. To this is added 1200 gallons of benzaldehyde and the mixture well stirred to effect complete solution. The mixture is then brought to a temperature of about 95° F. and allowed to separate into two layers.

The bottom layer, composed of naphthenic material and comprising approximately 750 gallons of mixed solvent liquid and 250 gallons of dissolved oil, is then withdrawn.

To the upper layer, comprising approximately 250 gallons of solvent liquid and 750 gallons of wax and oil, is added 750 gallons of benzaldehyde and 2,000 gallons of alcohol. This mixture is well stirred and chilled to about −20° F. and while maintained at that temperature is introduced to filtering means wherein the solid hydrocarbons are separated in the form of a filter cake.

The filter cake is washed with additional solvent liquid mixture of substantially the same composition and which has been chilled to a temperature of −20° F. This washed filtrate is used for a part of the solvent mixture in a succeeding batch, allowance being made for the oil contained therein.

From the dewaxed filtrate, substantially all of the alcohol is distilled and recovered. The resulting mixture is cooled to a temperature of approximately 105° F. whereupon separation into two layers will occur. The upper layer will comprise the high viscosity index constituents, while the lower layer will contain the low viscosity index constituents. The resulting layers are separately removed and the solvent recovered therefrom.

The oil contained in the high viscosity index upper layer, after being finished by contact filtration in the presence of steam and clay, has the following characteristics:

| | |
|---|---|
| Gravity °A. P. I. | 28.6 |
| Saybolt universal viscosity at 210° F. | 67 |
| Viscosity index | 97 |
| Pour test °F. | −10 |

In the event extremely high viscosity index oils are desired, approaching the order of 100 viscosity index, it may be advantageous to further extract the high viscosity index upper layer obtained in the foregoing final separation. In this case, this high viscosity index layer may be further extracted, either by batch or countercurrent treatment with benzaldehyde or the desired proportions of benzaldehyde and alcohol. An example of oil obtained by such further extraction, will have the following characteristics:

| | |
|---|---|
| Gravity °A. P. I. | 30.4 |
| Saybolt universal viscosity at 210° F. | 65 |
| Viscosity index | 100 |
| Pour test °F. | −15 |
| Percent Carbon residue | .02 |
| Percent Sulphur | .09 |

While preliminary extraction of the oil prior to dewaxing has been described in the foregoing example, it is contemplated, as previously indicated, that the oil may be dewaxed first without subjecting to the initial separation, and then separated into the desired final fractions.

I have found that, in dewaxing for the production of oil having a pour test of 0° F. and below, the proportion of benzaldehyde in the mixture of benzaldehyde and alcohol may range from 20% to about 35%, depending upon the temperature at which dewaxing is carried out. On the other hand, in extracting the oil to effect separation into fractions of differing viscosity indices, the proportion of benzaldehyde may vary from 40% to 90%, depending upon the temperature at which the extraction is carried out.

The presence of alcohol in the separating mixture possesses the advantage of rendering the mixture of solvent and oil more susceptible to the selective action of the benzaldehyde. It also serves to reduce the viscosity of the mixture to thereby facilitate not only better contact between solvent and constituents of the oil but permits more ready separation into the resulting layers.

The invention is not limited to the production of final products of the characteristics of those produced in the examples given above. Products of varying characteristics may be produced by varying the proportions of solvent liquids and their concentration and the temperature at which the treating steps are carried out.

Furthermore, the invention is not limited to the treatment of wax distillate such as given in the examples herein but is adapted to the treatment of other paraffin-containing fractions, residual fractions, precipitates or materials somewhat similar in nature derived in various ways from mineral oils.

Thus my invention is applicable to the treatment of hydrogenation products resulting from the hydrogenation of carbonaceous materials, or mineral oils including liquid or solid hydrocarbon fractions derived from mineral oils. Hydrogenation products may contain substantial quantities of waxy or paraffin material as well as other constituents of relatively low lubricating value. By treating such products in accordance with my invention, final products of desired characteristics can be obtained.

The invention is not restricted to any particular operating condition such as that of temperature, or the composition of the solvent mixtures employed since these conditions may advantageously be varied, depending upon the nature of the fraction undergoing treatment as well as upon the particular characteristics desired in the final product.

It is also contemplated, in many instances, that it may be of advantage to carry on the filtration step in the presence of a comminuted solid filter-aid material. Such material may be admixed with the chilled mixture of oil and solvent liquid prior to introduction to the filtering means.

In the treatment of residual oils or of certain distillate oils which may contain asphalt, it may be desirable to separate the asphalt prior to the treatment for the extraction of the naphthenic constituents or prior to the dewaxing step.

In the appended claims, by the expression "amyl alcohol," I intend to include all alcohols having the empirical formula $C_5H_{11}OH$, whether these be produced as in the case of Pentasol, which is a trade name applied to a mixture of amyl alcohols produced by the treatment of pentane, or by fermentation as in the case of fusel oil of commerce. Pentasol is a mixture of amyl alcohols boiling from 241° to 277° F., while fusel oil is a mixture of iso-amyl alcohol and active amyl alcohol boiling from 262° to 269° F.

Also, while benzaldehyde has been specifically mentioned, it is contemplated that certain other aromatic aldehydes may be employed, as, for example, tolualdehyde, or mixtures of aromatic aldehydes. In the appended claims benzaldehyde is intended to include an aromatic aldehyde of the character of benzaldehyde and tolualdehyde or a mixture of such aldehydes.

Solvent refining with benzaldehyde may advantageously be carried out in the presence of a non-oxidizing atmosphere. For example, in recovering the solvent from the resulting extract and raffinate by distillation, it is of advantage to conduct the distilling and heating in a non-oxidizing atmosphere, such as carbon dioxide.

Obviously many modifications and variations of the invention, as hereinbefore set forth, may be made without departing from the spirit and scope thereof, and therefore only such limitations should be imposed as are indicated in the appended claims.

I claim:

1. The process of manufacturing high viscosity index lubricating oil having a low pour test from wax-bearing mineral oil which comprises mixing with the oil a solvent liquid mixture composed of substantial proportions of benzaldehyde and amyl alcohol boiling from about 241° to 277° F. in proportions such that at temperatures of 0° F. and below the solvent mixture has substantially complete solvent action on the liquid constituents but substantially no solvent action on the solid wax constituents of the oil, chilling the mixture to precipitate wax constituents of the oil, removing the wax thus precipitated, removing from the resulting dewaxed mixture a portion of the amyl alcohol to thereby alter the selective action of the solvent mixture, separating from the remaining mixture a fraction of desired viscosity index and low pour test and removing the solvent therefrom.

2. The process of dewaxing mineral lubricating oil comprising dissolving the oil in a solvent mixture composed of benzaldehyde and amyl alcohol boiling from about 241° to 277° F. mixed in proportion with each other and to the oil such that the mixture has a selective solvent action as between wax and oil at temperatures of the order of —20° F., chilling the mixture to solidify the wax, removing the wax thus solidified, and recovering the solvent liquid from the dewaxed oil.

3. The process of dewaxing mineral lubricating oil comprising dissolving the oil in a solvent mixture composed of benzaldehyde and amyl alcohol boiling from about 241° to 277° F, in which the benzaldehyde comprises from about 20% to about 35% of the mixture, chilling the mixture to solidify the wax, removing the wax thus solidified, and recovering the solvent liquid from the dewaxed oil.

4. The method of separating mineral oil containing relatively high viscosity index and relatively low viscosity index oil into fractions respectively rich in relatively high and relatively low viscosity index constituents comprising extracting the oil with benzaldehyde in the presence of amyl alcohol boiling from about 241° to 277° F., said solvent forming with the oil a two-layer liquid system, separately removing the layers, and recovering the solvent liquid therefrom.

5. The method of separating mineral oil containing relatively high viscosity index and relatively low viscosity index oil into fractions respectively rich in relatively high and relatively low viscosity index constituents comprising extracting the oil with a solvent mixture composed of benzaldehyde and amyl alcohol boiling from about 241° to 277° F., the benzaldehyde comprising from about 40% to about 90% of the mixture, whereby the mixture of solvent and oil separates into two layers, separately removing the resulting layers, and recovering the solvent liquid therefrom.

6. The process of manufacturing low cold test, high viscosity index, lubricating oil from wax-bearing mineral oil comprising mixing the oil with a mixture of benzaldehyde and amyl alcohol boiling from about 241° to 277° F., and comprising predominantly benzaldehyde, whereby the mixture separates into an extract layer and a raffinate layer containing wax constituents, removing the extract layer, adding further solvent liquids to said raffinate layer to form a mixture therewith containing benzaldehyde and amyl alcohol in proportions such that the solvent mixture has selective action as between wax and oil at temperatures of 0° F. and below, chilling the mixture to separate the wax, removing the wax thus separated, removing amyl alcohol from the dewaxed mixture in such proportion that the remaining solvent mixture exerts selective action as between differing viscosity index constituents of the dewaxed oil, and the mixture of oil and remaining solvent separates into layers, separately removing the layers, and recovering the solvent liquids therefrom.

7. The method of manufacturing low pour test, high viscosity index oil from wax-bearing mineral lubricating oil wherein the oil is dewaxed and then extracted, comprising mixing with the oil benzaldehyde and amyl alcohol boiling from about 241° to 277° F. in proportions such that the solvent mixture exerts a selective action as between wax and oil at temperatures of the order of —20° F., chilling the mixture to separate the wax, removing the wax thus separated, removing substantially all of the amyl alcohol from the dewaxed solvent mixture, thereby producing a mixture of dewaxed oil and solvent liquid comprising mainly benzaldehyde having a selective action as between differing viscosity index constituents of the dewaxed oil, separating from said mixture a fraction of desired viscosity index and low pour test, and removing the solvent therefrom.

8. The method according to claim 2 in which the oil is preliminarily mixed with amyl alcohol boiling from 241° to 277° F., asphalt is separated and is removed from the oil and substantially all of the alcohol so mixed is retained in the oil to form a component part of the solvent used in the subsequent steps.

9. The method according to claim 5 in which the oil is preliminarily mixed with amyl alcohol boiling from 241° to 277° F., asphalt is separated and is removed from the oil and substantially all of the alcohol so mixed is retained in the oil to form a component part of the solvent used in the subsequent steps.

10. The method according to claim 6 in which the oil is preliminarily mixed with amyl alcohol boiling from 241° to 277° F., and asphalt is separated and is removed from the oil and substantially all of the alcohol so mixed is retained in the oil to form a component part of the solvent used in the subsequent steps.

FRANCIS X. GOVERS.